(12) United States Patent
Kim et al.

(10) Patent No.: US 12,416,188 B2
(45) Date of Patent: Sep. 16, 2025

(54) ACTIVE HOOD HINGE FOR VEHICLE

(71) Applicant: PHA CO., LTD., Daegu (KR)

(72) Inventors: Seung Wan Kim, Daegu (KR); Dong Hyun Kim, Daegu (KR)

(73) Assignee: PHA CO., LTD., Daegu (KR)

( * ) Notice: Subject to any disclaimer, the term of this patent is extended or adjusted under 35 U.S.C. 154(b) by 71 days.

(21) Appl. No.: 18/496,955

(22) Filed: Oct. 30, 2023

(65) Prior Publication Data

US 2025/0137307 A1 May 1, 2025

(51) Int. Cl.
*E05D 3/14* (2006.01)
*B60R 21/38* (2011.01)

(52) U.S. Cl.
CPC .............. *E05D 3/145* (2013.01); *B60R 21/38* (2013.01); *E05Y 2900/536* (2013.01)

(58) Field of Classification Search
CPC ......... B60R 21/38; B60R 21/34; E05D 3/145; E05D 3/14; E05D 3/06; E05Y 2900/536; B62D 25/12
See application file for complete search history.

(56) References Cited

U.S. PATENT DOCUMENTS

| | | | |
|---|---|---|---|
| 7,552,789 B2* | 6/2009 | Gust ....................... | E05D 3/145 |
| | | | 180/69.24 |
| 2012/0084942 A1* | 4/2012 | Mehta .................... | B60R 21/38 |
| | | | 16/349 |
| 2014/0182962 A1* | 7/2014 | McIntyre, I ........... | B60R 21/38 |
| | | | 180/274 |
| 2015/0167369 A1* | 6/2015 | Hwang ................. | E05D 7/1066 |
| | | | 16/233 |
| 2016/0144822 A1* | 5/2016 | Kim ........................ | B60R 21/38 |
| | | | 16/222 |
| 2017/0259776 A1* | 9/2017 | McLundie .............. | B60R 21/38 |
| 2017/0282847 A1* | 10/2017 | Jenny ...................... | B60R 21/36 |
| 2017/0369028 A1* | 12/2017 | Patterson ................ | E05D 11/08 |
| 2018/0141516 A1* | 5/2018 | Hwang ................... | B60R 21/38 |
| 2019/0241150 A1* | 8/2019 | Fredriksson ............ | B60R 21/38 |

(Continued)

FOREIGN PATENT DOCUMENTS

| | | |
|---|---|---|
| DE | 102009040413 A1 | 3/2011 |
| DE | 102015203516 A1 | 9/2016 |

(Continued)

OTHER PUBLICATIONS

Extended European Search Report dated Apr. 8, 2024 in European Patent Application No. 23205732.3.

*Primary Examiner* — Emily M Morgan
(74) *Attorney, Agent, or Firm* — AJU IP Global PLLC

(57) ABSTRACT

An active hood hinge for a vehicle includes: a vehicle body bracket fixedly coupled to a vehicle body of a vehicle; a hood bracket fixedly coupled to a hood of the vehicle; an arm having a front end connected to the hood bracket, and a rear end connected to the vehicle body bracket; a lever connected to the arm; a locking pin having one side fixed to the lever and the other side protruding through the hood bracket and the arm; a locking bracket having one side fixed to the hood bracket and the other side coupled to the other side of the locking pin; and an actuator configured to push up the lever so that the locking bracket is damaged and the arm and the hood bracket are lifted when a frontal collision accident of the vehicle occurs.

8 Claims, 7 Drawing Sheets

(56) References Cited

U.S. PATENT DOCUMENTS

| | | | |
|---|---|---|---|
| 2019/0375369 A1* | 12/2019 | Hufen | B60R 21/38 |
| 2020/0164831 A1* | 5/2020 | Wood | B62D 25/105 |
| 2020/0165851 A1 | 5/2020 | Page et al. | |
| 2020/0231113 A1* | 7/2020 | Weichsel | E05B 77/08 |
| 2021/0300295 A1* | 9/2021 | Sasaki | B60R 21/38 |
| 2022/0048462 A1* | 2/2022 | Boiger | B60R 21/38 |
| 2022/0136301 A1* | 5/2022 | Wood | B60R 21/38 16/295 |
| 2024/0253591 A1* | 8/2024 | McDonald | E05D 11/00 |

FOREIGN PATENT DOCUMENTS

| | | |
|---|---|---|
| EP | 1759937 A2 | 3/2007 |
| FR | 2910872 A1 | 7/2008 |
| KR | 10-1241017 B1 | 3/2013 |
| KR | 10-1610945 B1 | 4/2016 |
| KR | 2018-0004216 A | 1/2018 |

\* cited by examiner

ACTIVE HOOD HINGE FOR VEHICLE

BACKGROUND

1. Field of the Invention

The present disclosure relates to an active hood hinge for a vehicle, which relieves an impact on an upper body including a pedestrian's head by lifting a hood upon collision with the pedestrian.

2. Discussion of Related Art

In general, hoods or bonnets in vehicles function to not only open and close an engine room but also block engine noises by shielding the engine room. The hood is coupled to a vehicle body above the engine room via a hood hinge, and the engine room is opened and closed as the hood rotates around the hood hinge.

In the case of a traditional hood hinge, when a pedestrian collides with the front of the vehicle, the pedestrian's upper body including the pedestrian's head may hit the hood strongly, resulting in serious injury to the pedestrian. In recent years, an active hood hinge for alleviating an impact received by a pedestrian falling toward the hood has tended to be applied when the pedestrian collides with the front of the vehicle.

The active hood hinge separates the hood from the engine and transmission positioned in the engine room by lifting the rear end of the hood when the pedestrian collides with the vehicle and falls toward the hood. Even when the pedestrian falls and collides with the lifted hood, the impact is absorbed as the hood is sufficiently bent, and the pedestrian's head does not collide strongly with the engine and transmission, so that it is possible to alleviate the pedestrian's impact and reduce the level of injury.

However, there is a problem in that since the conventional active hood hinge is provided with a hook that is pressurized by a spring and a complex multi-bar link structure, the operation reliability is lowered and it is difficult to reduce the weight. In addition, there is also a problem in that the assembly productivity is lowered, and the manufacturing cost is increased.

Background art for the present disclosure is disclosed in Korean Patent Registration Publication No. 10-1241017 (registered on Mar. 4, 2013, entitled HOOD HINGE DEVICE FOR REDUCING PEDESTRIAN'S INJURY).

SUMMARY OF THE INVENTION

The present disclosure provides an active hood hinge for a vehicle, which can improve operation reliability, and reduce a weight and a size with a simple structure.

The present disclosure provides an active hood hinge for a vehicle including: a vehicle body bracket fixedly coupled to a vehicle body of a vehicle; a hood bracket fixedly coupled to a hood of the vehicle; an arm having a front end connected to the hood bracket, and a rear end connected to the vehicle body bracket; a lever connected to the arm; a locking pin having one side fixed to the lever and the other side protruding through the hood bracket and the arm; a locking bracket having one side fixed to the hood bracket and the other side coupled to the other side of the locking pin; and an actuator configured to push up the lever so that the locking bracket is damaged and the hood bracket is lifted.

The locking bracket may include: a body fixed to the hood bracket; and at least one finger protruding from the body to surround the locking pin.

A notch, which is concavely recessed, may be formed at a boundary between the at least one finger and the body, and when the actuator pushes up the lever, the at least one finger may be transformed around the notch.

A front end of the hood bracket may be connected to the front end of the arm, and when the actuator pushes up the lever, the hood bracket may rotate around the front end of the arm so that a rear end of the hood bracket is higher than the front end of the hood bracket.

The hood bracket may be fixedly coupled to a rear end of the hood, and when a front end of the hood is lifted in a state in which the actuator does not push up the lever, the hood bracket may move up so that a front end is higher than a rear end, and the arm may be fixed to the hood bracket and may move up so that the front end is higher than the rear end.

The active hood hinge for a vehicle according to the present disclosure may further include a rear end connection link including a lower end rotatably connected to a rear end of the vehicle body bracket, and an upper end rotatably connected to the rear end of the arm.

The hood bracket may be fixedly coupled to a rear end of the hood, and when a front end of the hood is lifted in a state in which the actuator does not push up the lever, the rear end connection link may rotate around the lower end of the rear end connection link so that the upper end of the rear end connection link moves from a position behind the lower end of the rear end connection link to a position in front of the lower end of the rear end connection link.

The active hood hinge for a vehicle may further include an intermediate connection link including a lower end rotatably connected between a front end and the rear end of the vehicle body bracket and an upper end rotatably connected between the front end and the rear end of the arm, and having a longer length than a length of the rear end connection link.

An active hood hinge for a vehicle according to the present disclosure has a simple structure in which a hood bracket is pushed up while a locking bracket coupled to a locking pin is damaged by a pressurizing force of an actuator, and does not have a hook that is pressurized by a spring or a multi-bar link structure.

Accordingly, it is possible to improve operation reliability in both cases in which a frontal collision accident of the vehicle occurs and does not occur, and it is easy to reduce the weight and size. In addition, it is possible to improve assembly productivity of the active hood hinge for a vehicle, and also reduce a manufacturing cost.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 2 shows a state when a frontal collision accident does not occur viewed from a top front, and FIG. 3 shows a state when the frontal collision accident occurs viewed from a bottom back;

DETAILED DESCRIPTION OF EXEMPLARY EMBODIMENTS

Hereinafter, an active hood hinge for a vehicle according to an embodiment of the present disclosure will be described in detail with reference to the accompanying drawings. The terms used in this specification are terms used to appropriately express exemplary embodiments of the present disclosure, which may vary depending on the intention of a user or an operator, customs in the field to which the present disclosure pertains, and the like. Accordingly, the terms should be defined based on the content throughout this specification.

Figure 1:
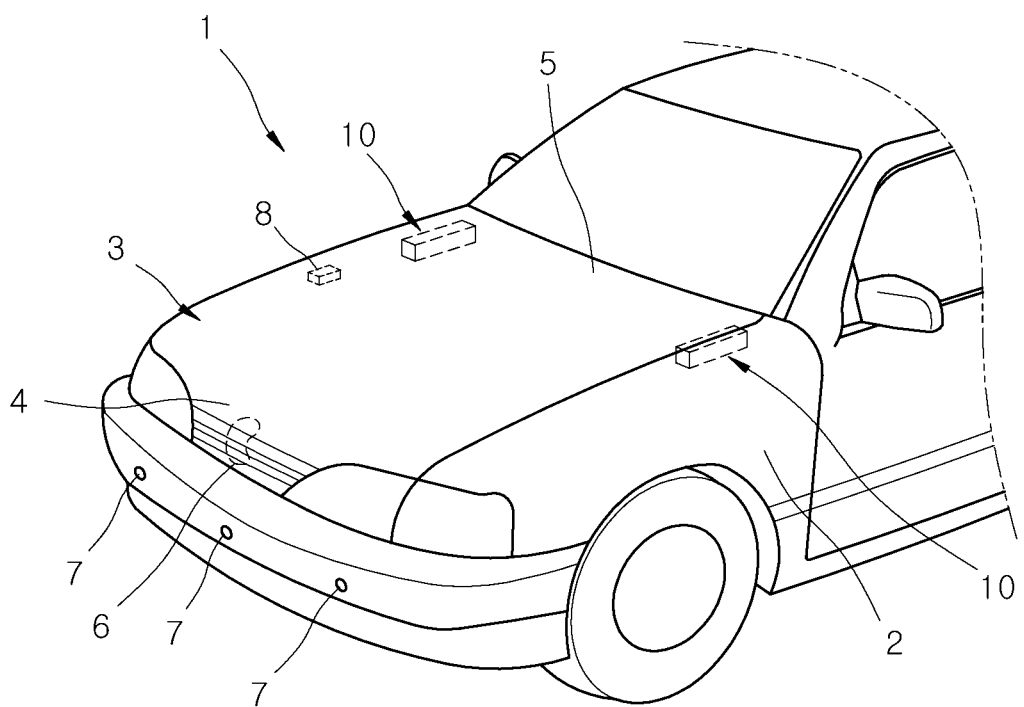
FIG. 1 is a perspective view showing an example of a vehicle to which an active hood hinge for a vehicle is applied.
Figure 2:
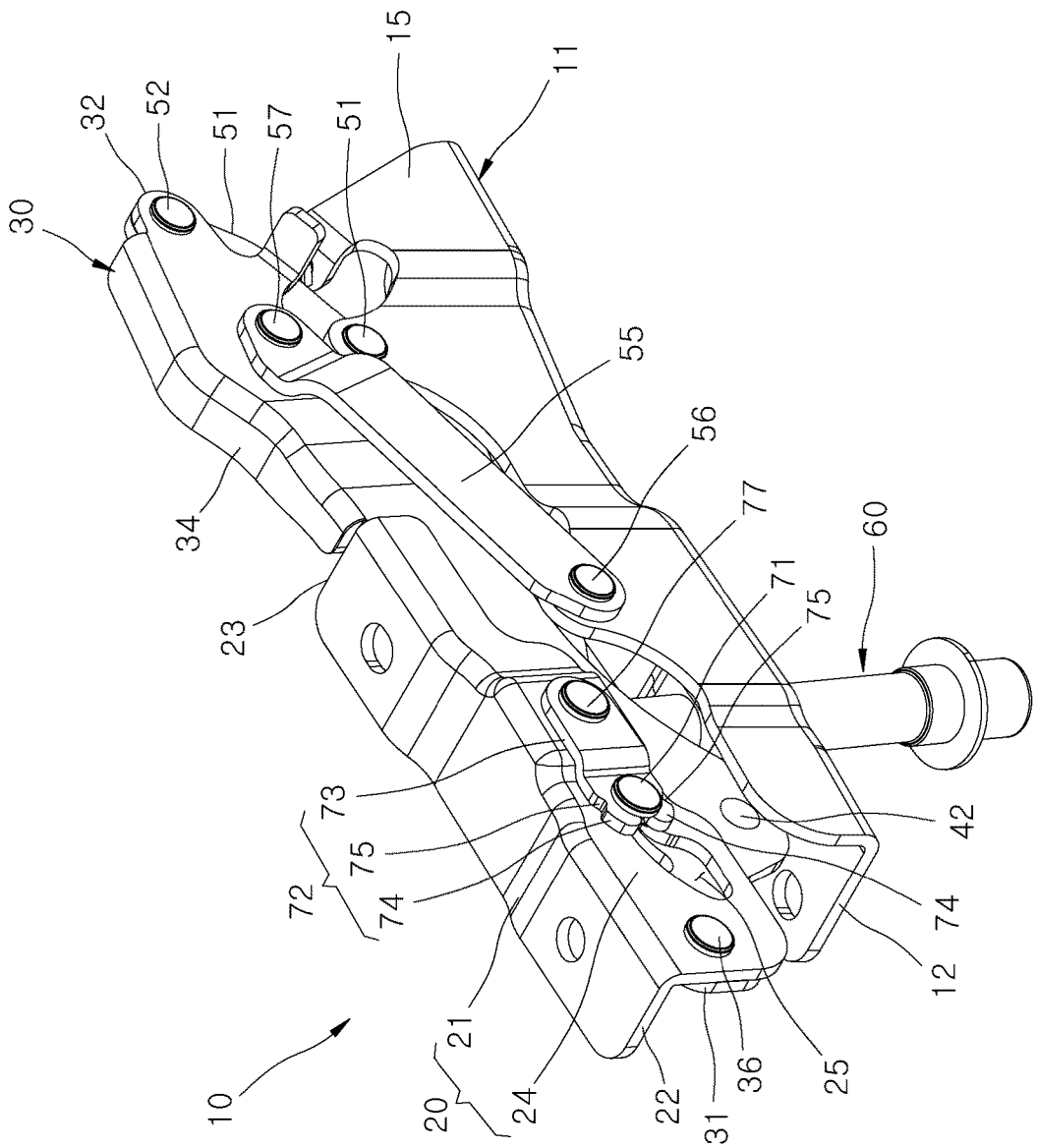
FIGS. 2 and 3 are perspective views of an active hood hinge for a vehicle according to an embodiment of the present disclosure.
Figure 3:
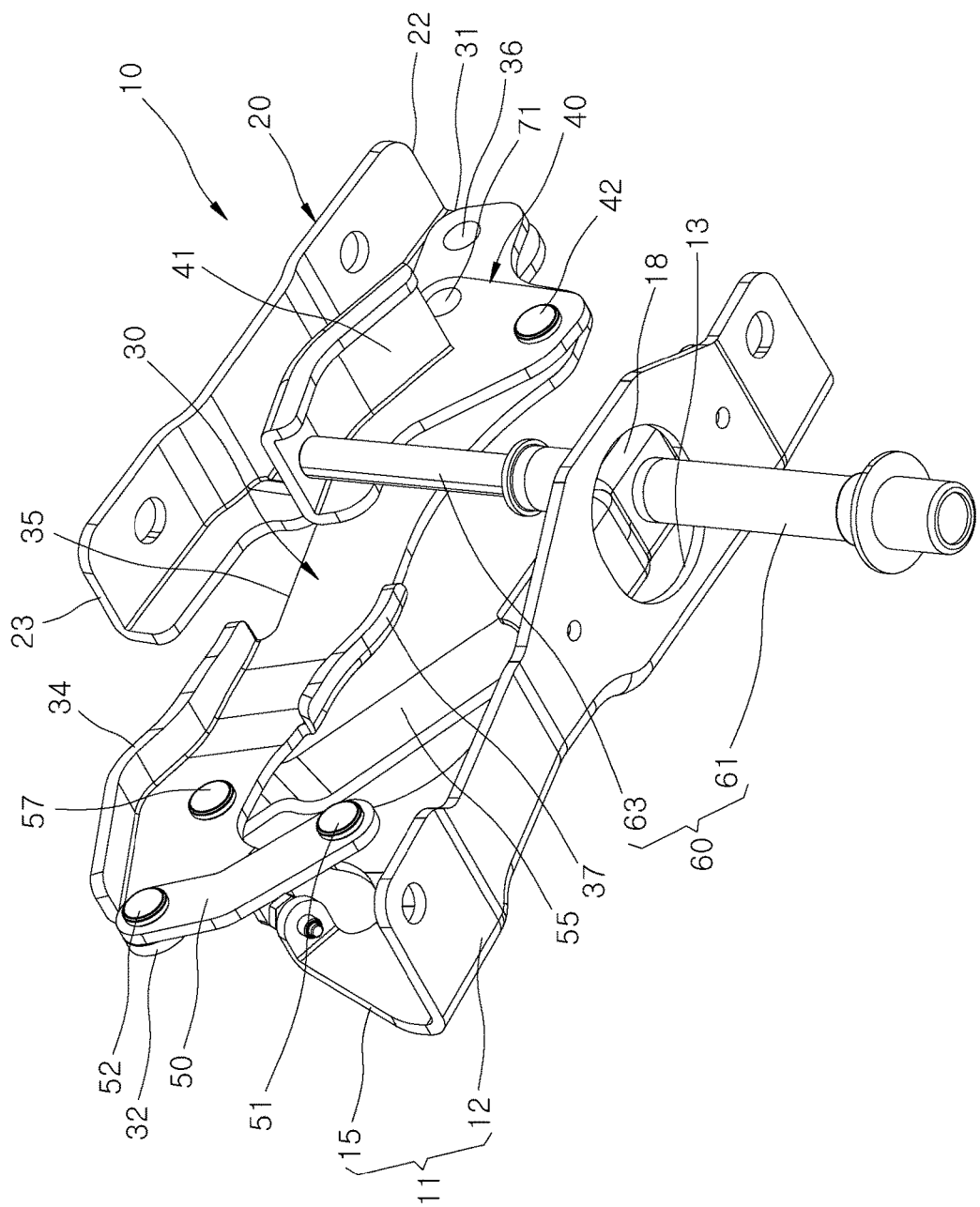
Figure 4:
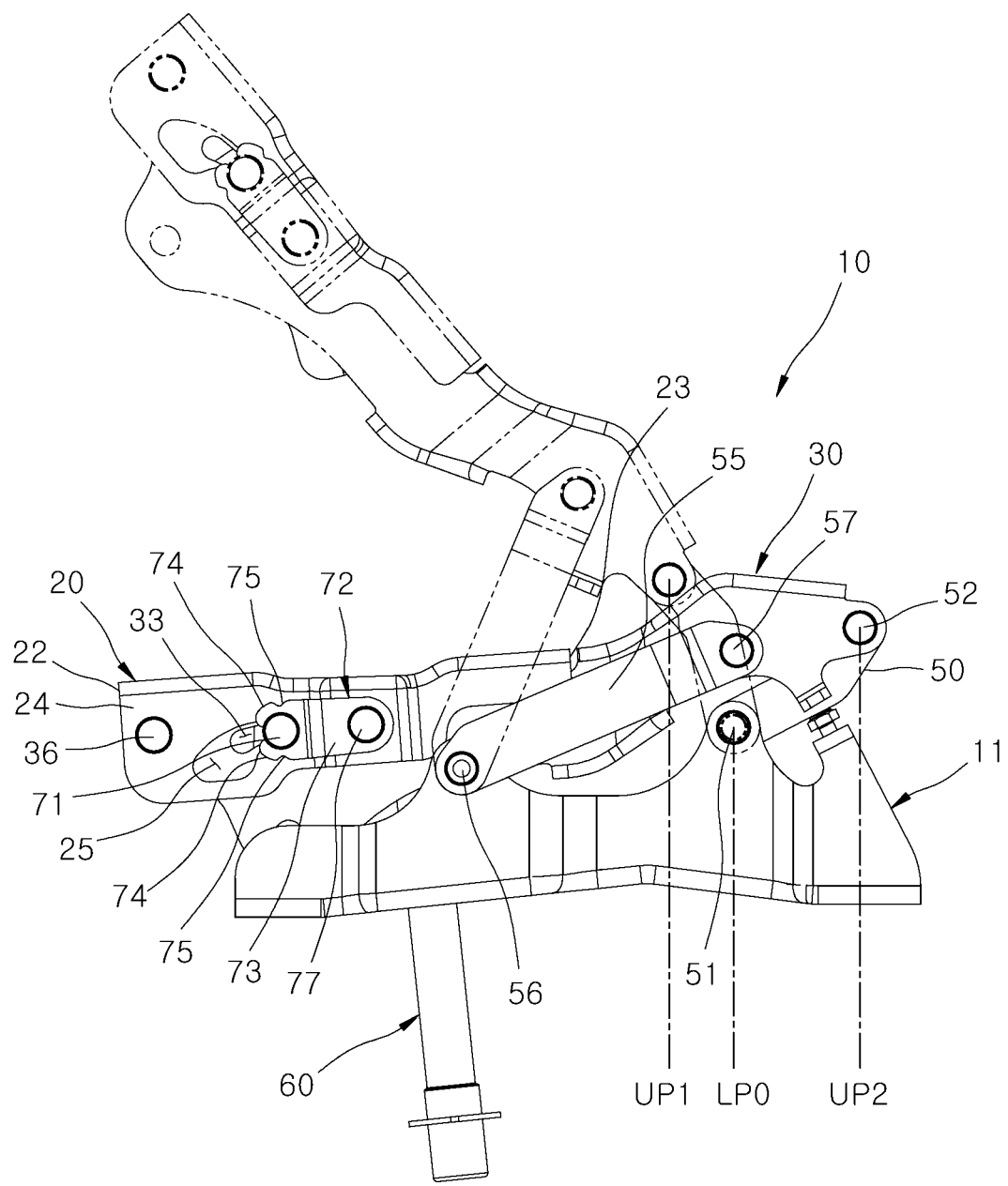
FIGS. 4 and 5 are front and back views of the active hood hinge for a vehicle according to the embodiment of the present disclosure, and views showing the state when the frontal collision accident does not occur.
Figure 5:
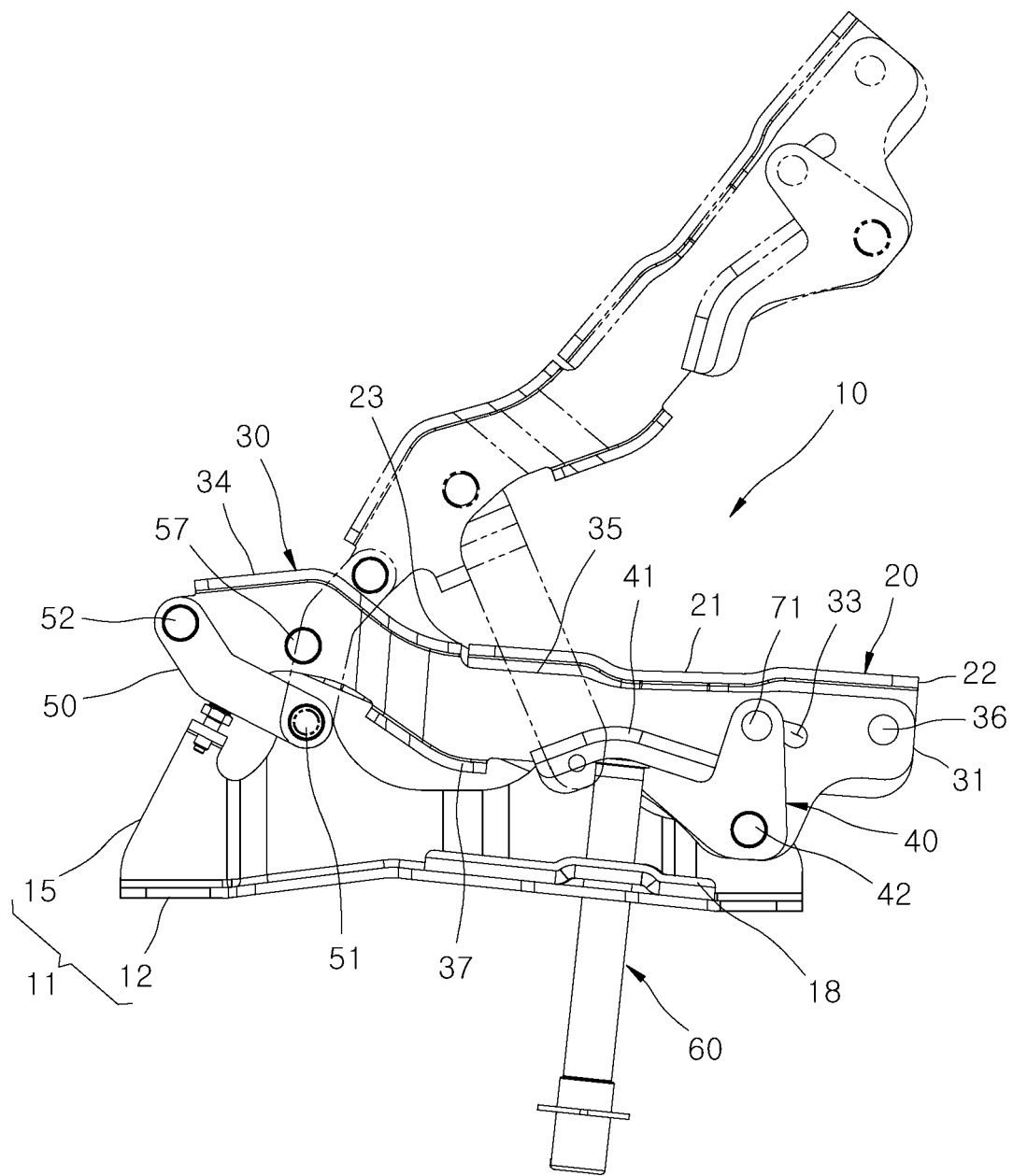
Figure 6:
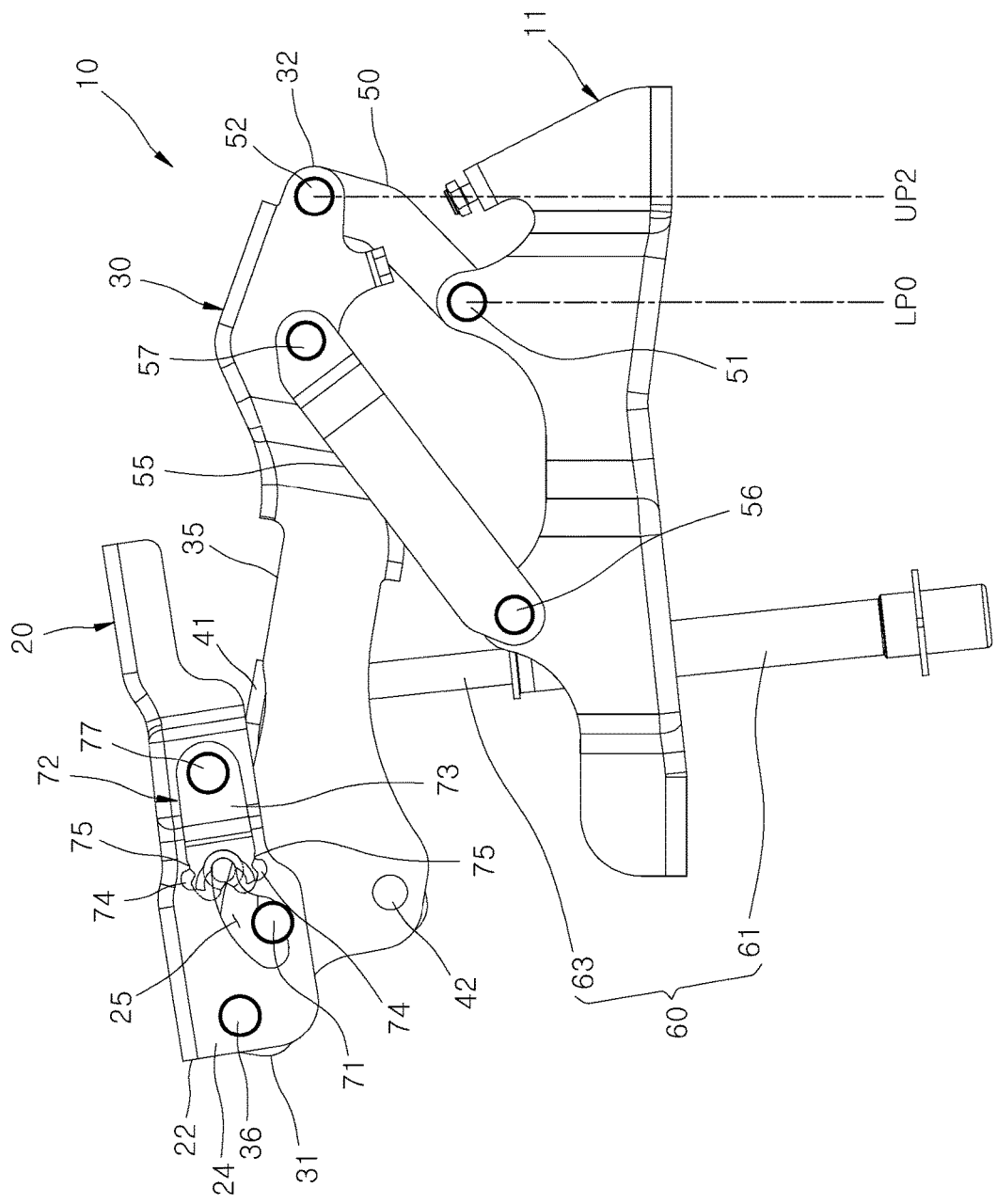
FIGS. 6 and 7 are front and back views of the active hood hinge for a vehicle according to the embodiment of the present disclosure, and views showing the state when the frontal collision accident occurs.
Figure 7:
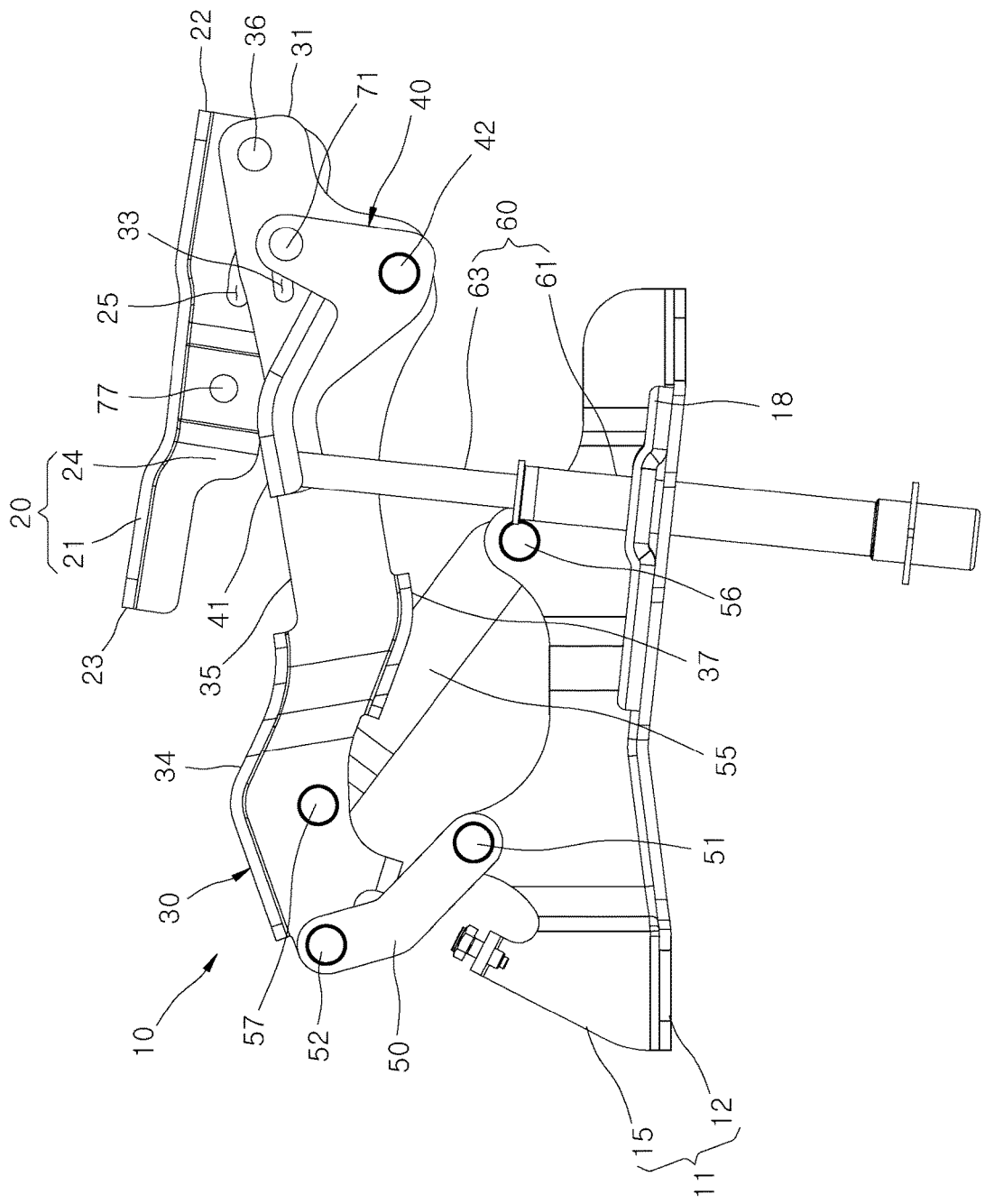

FIG. 1 is a perspective view showing an example of a vehicle to which an active hood hinge for a vehicle is applied, FIGS. 2 and 3 are perspective views of an active hood hinge for a vehicle according to an embodiment of the present disclosure, wherein FIG. 2 shows a state when a frontal collision accident does not occur viewed from a top front, and FIG. 3 shows a state when the frontal collision accident occurs viewed from a bottom back, FIGS. 4 and 5 are front and back views of the active hood hinge for a vehicle according to the embodiment of the present disclosure, and views showing the state when the frontal collision accident does not occur, and FIGS. 6 and 7 are front and back views of the active hood hinge for a vehicle according to the embodiment of the present disclosure, and views showing the state when the frontal collision accident occurs.

Referring to FIG. 1, an active hood hinge 10 for a vehicle according to an embodiment of the present disclosure is installed between a hood 3 and a vehicle body 2 of a vehicle 1 and supports the hood 3 so that the hood 3 rotates with respect to the vehicle body 2 when an engine room of the vehicle 1 is open by opening the hood 3. In addition, the active hood hinge 10 for a vehicle protects a pedestrian by providing a buffer space, which may absorb an impact when an upper body including the pedestrian's head collides with the hood 3 by lifting a rear end 5 of the hood 3 in the event of a frontal collision accident in which a front end of the vehicle 1 collides with the pedestrian (not shown).

The hood 3 functions as a cover configured to cover a top of the engine room. When the frontal collision accident occurs in a state in which the front end 4 of the hood 3 is caught on a latch 6, a sensor 7 installed on a bumper of the vehicle 1 detects the accident and transmits an accident occurrence signal to a controller 8. The controller 8 operates an actuator 60 (see FIGS. 2 to 7) by recognizing the occurrence of the frontal collision accident through the signal and transmitting a control signal. The rear end 5 of the hood 3 is lifted by an operation of the actuator 60, and the buffer space is formed between the engine and transmission, and the hood 3. A pair of active hood hinges 10 for a vehicle are installed in the vehicle 1, and specifically, are each installed at both ends of the vehicle 1 in a width direction.

Referring to FIGS. 1 to 7 together, the active hood hinge 10 for a vehicle according to the embodiment of the present disclosure includes a vehicle body bracket 11, a hood bracket 20, an arm 30, a lever 40, a locking pin 71, a locking bracket 72, a rear end connection link 50, an intermediate connection link 55, and an actuator 60. The vehicle body bracket 11 is fixedly coupled to the vehicle body 2 under the rear end 5 of the hood 3. The vehicle body bracket 11 may be made of, for example, a steel material.

The vehicle body bracket 11 includes, for example, a vehicle body fixing part 12 fixedly coupled to the vehicle body 2 using a bolt and a nut, and a wall part bent and protruding upward from the vehicle body fixing part 12. An actuator through hole 13 through which the actuator 60 passes is formed in the vehicle body fixing part 12. The hood bracket 20 may be made of, for example, a steel material, and is fixedly coupled to a lower surface of the rear end 5 of the hood 3. The hood bracket 20 includes a hood fixing part 21 fixedly coupled to the hood 3 using a bolt and a nut, and a wall part 24 bent and protruding downward from the hood fixing part 21.

The arm 30 has a front end 31 connected to a front end 22 of the hood bracket 21, and a rear end 32 connected to the vehicle body bracket 11 by the rear end connection link 50. The arm 30 may be made of, for example, a steel material. The arm 30 includes an upper rib 34 and a lower rib 37 bent and protruding from a portion of an upper edge and a portion of a lower edge in a horizontal direction in order to increase a bending strength. In addition, an upper groove portion 35, which is recessed to be stepped, is provided at the upper edge of the arm 30 because the upper rib 34 does not extend. When the hood fixing part 21 of the hood bracket 20 is supported in contact with the upper groove portion 35, the upper rib 34 of the arm and the hood fixing part 21 do not have a stepped portion, so that a load of the hood 3 may be distributed and supported by the upper rib 34 of the arm 30 as well as the hood fixing part 21. The front end 22 of the hood bracket 20 and the front end 31 of the arm 30 are connected to be rotatable with respect to each other by an arm pin 36 configured to thread and connect the front end 22 of the hood bracket 20 and the front end 31 of the arm 30.

The lever 40 is made of, for example, a steel material, and is connected to the arm 30 by a lever connection pin 42. Specifically, the lever connection pin 42 threads and connects a part of the arm 30 closer to the front end 31 than the rear end 32 of the arm 30 and a lower end of the lever 40. The lever 40 is rotatable with respect to the arm 30 around the lever connection pin 42. The lever 40 includes a receiver 41 extending to protrude backward so as to cross an actuator axis (not shown) extending in a longitudinal direction of the actuator 60.

The actuator 60 pushes up the lever 40 so that the arm 30 and the hood bracket 20 are lifted as shown in FIGS. 3, 6, and 7 when the frontal collision accident of the vehicle 1 occurs. Specifically, the actuator 60 includes a cylinder 61 extending upward by passing through the actuator through hole 13 of the vehicle body bracket 11, and a rod-shaped rod 63 inserted into an inside of the cylinder 61 so as to protrude upward from an upper end of the cylinder 61. The cylinder 61 and the rod 63 may be made of, for example, a steel material. An explosive may be installed inside the cylinder 61. When the explosive is detonated by a control signal of the controller 8, the rod 63 rapidly moves up with a strong force by the explosive force, and the receiver 41 of the lever 40 positioned on a path where the rod 63 moves up is strongly lifted.

The cylinder 61 may pass through the actuator fixing bracket 18 and may be fixedly coupled to the actuator fixing bracket 18, and the front end and the rear end of the actuator fixing bracket 18 may be fixedly bonded to the vehicle body fixing part 12 of the vehicle body bracket 11. With such a structure, the cylinder 61 of the actuator 60 may be fixed to the vehicle body bracket 11.

One side of the locking pin 71 is threaded and coupled to an upper end of the lever 40, and the other side thereof passes through and protrudes from the arm 30 and the wall part 24 of the hood bracket 20. The locking pin 71 may be made of, for example, a steel material. One side of the locking bracket 72 is fixed to the hood bracket 20 and the other side thereof is coupled to the other side of the locking pin 71. Specifically, the locking bracket 72 includes a body 73 and a pair of fingers 74 protruding forward from the body 73. The locking bracket 72 is coupled to the hood bracket 20 by a locking bracket coupling pin 77 configured to thread the wall part 24 of the hood bracket 20 and the body 73.

As shown in FIGS. 2 and 4, when the rod 63 of the actuator 60 does not push up the lever 40, the pair of fingers 74 surround an outer peripheral surface of the other side of the locking pin 71. Accordingly, the hood bracket 20, the arm 30, and the lever 40 are connected so that the three members 20, 30, and 40 move together, and one of the three members 20, 30, and 40 may not move independently of the other two members.

A pair of notches 75, which are concavely recessed in an alphabetic V-shaped groove, are formed at a boundary between the pair of fingers 74 and the body 73. When the rod 63 of the actuator 60 pushes up the receiver 41 of the lever 40, as shown by the solid line in FIG. 6, the pair of fingers 74 are transformed in directions separated from each other with respect to the pair of notches 75. In other words, the locking bracket 72 is damaged. Accordingly, the locking pin 71 is separated from the locking bracket 72, the arm 30 and the hood bracket 20 connected to the lever 40 by the locking pin 71 are lifted by a force at which the rod 63 of the actuator 60 pushes up the lever 40, and the rear end 5 of the hood 3 fixedly supported by the hood bracket 20 is lifted.

The rear end connection link 50 has a lower end rotatably connected to a rear end of the vehicle body bracket 11 and an upper end rotatably connected to the rear end 32 of the arm 30. Specifically, the rear end connection link 50 is connected to the vehicle body bracket 11 rotatably around a first rear end link pin 51 by the first rear end link pin 51 configured to thread and connect the rear end of the wall part 15 of the vehicle body bracket 11 and the lower end of the rear end connection link 50. In addition, the arm 30 is connected to the rear end connection link 50 rotatably around a second rear end link pin 52 by the second rear end link pin 52 configured to thread and connect the rear end 32 of the arm 30 and the upper end of the rear end connection link 50. The rear end connection link 50 may be made of, for example, a steel material.

The intermediate connection link 55 has a lower end rotatably connected between a front end and the rear end of the vehicle body bracket 11 and an upper end rotatably connected between the front end 31 and the rear end 32 of the arm 30. Specifically, the intermediate connection link 55 is connected to the vehicle body bracket 11 rotatably around a first intermediate link pin 56 by the first intermediate link pin 56 configured to thread and connect a portion between the front end and the rear end of the wall part 15 of the vehicle body bracket 11 and the lower end of the intermediate connection link 55. In addition, the arm 30 is connected to the intermediate connection link 55 rotatably around a second intermediate link pin 57 by the second intermediate link pin 57 configured to thread and connect a portion between the front end 31 and the rear end 32 of the arm 30 and the upper end of the intermediate connection link 55. A length of the intermediate connection link 55 is longer than a length of the rear end connection link 50. The intermediate connection link 55 may be made of, for example, a steel material.

In a state in which the frontal collision accident does not occur and the engine room of the vehicle 1 is not open, that is, a state in which the rod 63 of the actuator 60 does not push up the lever 40 and the front end 4 of the hood 3 is not lifted, the lever 40, the arm 30, and the hood bracket 20 do not move, and the locking bracket 72 is not damaged as shown by the solid lines in FIGS. 4 and 5. At this time, the front end 31 of the arm 30 is positioned at a slightly lower height than the rear end 32, and the front end 22 of the hood bracket 20 is also positioned at a slightly lower height than the rear end 23. A position of the upper end of the rear end connection link 50, specifically, a position UP0 of the second rear end link pin 52 is positioned behind a position of the lower end of the rear end connection link 50, specifically, a position of the first rear end link pin 51.

In a state in which the frontal collision accident does not occur but the engine room of the vehicle 1 is open, that is, a state in which the rod 63 of the actuator 60 does not push up the lever 40 but the front end 4 of the hood 3 is lifted, the lever 40, the arm 30, and the hood bracket 20 are connected to each other and move together because the locking bracket 72 is still not damaged as shown by the dashed-dotted lines in FIGS. 4 and 5. In other words, the lever 40, the arm 30, and the hood bracket 20 are fixed relatively with respect to each other. In other words, the hood bracket 20 moves up so that the front end 22 is higher than the rear end 23, and the arm 30 is also connected to the hood bracket 20 and moves up so that the front end 31 is higher than the rear end 32.

At this time, the arm 30 rotates around the upper end of the rear end connection link 50, specifically, the second rear end link pin 52, and rotates around the upper end of the intermediate connection link 55, specifically, the second intermediate link pin 57. At the same time, the rear end connection link 50 rotates around the lower end of the rear end connection link 50, specifically, the first rear end link pin 51, and the intermediate connection link 55 rotates around the lower end of the intermediate connection link 55, specifically, the first intermediate link pin 56. Accordingly, a position of the upper end of the rear end connection link 50, that is, the second rear end link pin 52 moves from the position UP0 behind a position LP0 of the lower end of the rear end connection link 50, that is, the first rear end link pin 51 to a position UP1 in front of the position LP0. With this configuration, a driver may easily open and close the engine room by holding and lifting or moving the front end 4 of the hood 3 downward in an ergonomically comfortable posture.

When the frontal collision accident occurs and the rod 63 of the actuator 60 pushes up the lever 40 with a strong impact, as shown in FIGS. 6 and 7, a strong force and impact are transmitted to the locking bracket 72 through the locking pin 71 and thus the locking bracket 72 is damaged. Specifically, as shown by the solid line in FIG. 6, the pair of fingers 74 may be transformed to be bent in a direction in which the pair of fingers 74 are separated from each other with respect to the pair of notches 75, or in severe cases, at least one of the pair of fingers 74 may also be separately cut.

In a state in which the coupling between the locking bracket 72 and the locking pin 71 is released, the force at which the rod 63 of the actuator 60 pushes up the lever 40 is transmitted to the arm 30 and the hood bracket 20 by the lever 40 and the locking pin 71 so that the arm 30 and the hood bracket 20 are lifted. The arm 30 moves up so that a height of the front end 31 and a height of the rear end 32 become substantially the same. At this time, the arm 30 rotates around the upper end of the rear end connection link 50, specifically, the second rear end link pin 52, and rotates around the upper end of the intermediate connection link 55, specifically, the second intermediate link pin 57. At the same time, the rear end connection link 50 rotates around the lower end of the rear end connection link 50, specifically, the first rear end link pin 51, and the intermediate connection link 55 rotates around the lower end of the intermediate connection link 55, specifically, the first intermediate link pin 56.

However, rotation angles of the rear end connection link 50, the intermediate connection link 55, and the arm 30 are smaller than a rotation angle in a case in which the front end 4 of the hood 3 is lifted in the state in which the frontal collision accident does not occur. Accordingly, a position UP2 of the upper end of the rear end connection link 50, that is, the second rear end link pin 52 moves forward from the position UP0 of the rear end link pin 52 in the case in which the frontal collision accident does not occur and the front end 5 of the hood 3 is not lifted, but is positioned behind the position UP1 of the rear end link pin 52 in the case in which the frontal collision accident does not occur and the front end 5 of the hood 3 is lifted to the maximum. In addition, the position UP2 of the rear end link pin 52 in the case in which the frontal collision accident occurs is still positioned behind the position LP0 of the first rear end link pin 51.

Meanwhile, when the rod 63 of the actuator 60 pushes up the lever 40, the hood bracket 20 connected by the locking pin 71 rotates around the front end of the arm 30, specifically, the arm pin 36, so that the rear end 23 of the hood bracket 20 is higher than the front end 22 of the hood bracket 20, and the hood fixing part 21 of the hood bracket 20 is spaced apart from the upper groove portion 35 of the arm 30.

The arm 30 is formed with a guide opening 33 extending in a direction centered on the lever connection pin 42 so that the lever 40 and the locking pin 71 may rotate around the lever connection pin 42 with respect to the arm 30 by the force at which the rod 63 of the actuator 60 pushes up the lever 40. The locking pin 71 passes through the guide opening 33.

The wall part 24 of the hood bracket 20 is formed with a cam opening 25 through which the locking pin 71 passes. The cam opening 25 induces a rotation motion of the hood bracket 20 so that the rear end 23 of the hood bracket 20 is higher than the front end 22 thereof by the rotation of the hood bracket 20 around the arm pin 36 as the locking pin 71 rotates around the lever connection pin 42 with respect to the arm 30.

The above-described active hood hinge 10 for a vehicle has a simple structure in which the hood bracket 20 is pushed up as the locking bracket 73 coupled to the locking pin 71 is damaged by a pressurization force of the actuator 60 and does not have a hook that is pressurized by a spring or a multi-bar link structure. Accordingly, it is possible to improve operation reliability in both cases in which the frontal collision accident of the vehicle 1 occurs and does not occur, and it is easy to reduce the weight and the size. In addition, it is possible to improve the assembly productivity of the active hood hinge 10 for a vehicle, and also reduce the manufacturing cost.

Although the present disclosure has been described with reference to one embodiment shown in the drawings, this is merely illustrative, and those skilled in the art to which the present technology pertains will understand that various modifications and equivalent other embodiments are possible.

What is claimed is:

1. An active hood hinge for a vehicle, comprising:
   a vehicle body bracket fixedly coupled to a vehicle body of a vehicle;
   a hood bracket fixedly coupled to a hood of the vehicle;
   an arm having a front end of the arm directly connected to the hood bracket, and a rear end of the arm indirectly connected to the vehicle body bracket via a rear end connection link;
   a lever connected to the arm;
   a locking pin having a first side of the locking pin fixed to the lever and a second side of the locking pin protruding through the hood bracket and the arm;
   a locking bracket having a first side of the locking bracket fixed to the hood bracket and a second side of the locking bracket coupled to the second side of the locking pin; and
   an actuator configured to push up the lever so that the locking pin is separated from the locking bracket and the hood bracket is lifted.

2. The active hood hinge for the vehicle of claim 1, wherein the locking bracket includes:
   a body fixed to the hood bracket; and
   at least one finger protruding from the body to surround the locking pin.

3. The active hood hinge for the vehicle of claim 2, wherein:
   the at least one finger comprises a pair of fingers,
   a notch, which is concavely recessed, is formed at a boundary between the pair of fingers and the body, and
   when the actuator pushes up the lever, the pair of fingers are transformed in directions separated from each other around the notch.

4. The active hood hinge for the vehicle of claim 1, wherein:
   a front end of the hood bracket is connected to the front end of the arm, and
   when the actuator pushes up the lever, the hood bracket rotates around the front end of the arm so that a rear end of the hood bracket is higher than the front end of the hood bracket.

5. The active hood hinge for the vehicle of claim 1, wherein the hood bracket is fixedly coupled to a rear end of the hood, and
   when a front end of the hood is lifted in a state in which the actuator does not push up the lever,
   the hood bracket moves up so that a front end of the hood bracket is higher than a rear end of the hood bracket, and
   the arm is fixed to the hood bracket and moves up so that the front end of the arm is higher than the rear end of the arm.

6. The active hood hinge for the vehicle of claim 1, wherein the rear end connection link includes a lower end of the rear end connection link rotatably connected to a rear end of the vehicle body bracket, and an upper end of the rear end connection link rotatably connected to the rear end of the arm.

7. The active hood hinge for the vehicle of claim 6, wherein the hood bracket is fixedly coupled to a rear end of the hood, and
   when a front end of the hood is lifted in a state in which the actuator does not push up the lever, the rear end connection link rotates around the lower end of the rear end connection link so that the upper end of the rear end connection link moves from a position behind the lower end of the rear end connection link to a position in front of the lower end of the rear end connection link.

8. The active hood hinge for the vehicle of claim 6, further comprising an intermediate connection link including:
   a lower end of the intermediate connection link rotatable connected between a front end of the vehicle body bracket and the rear end of the vehicle body bracket, and
   an upper end of the intermediate connection link rotatably connected between the front end of the arm and the rear end of the arm and having a longer length than a length of the rear end connection link.

* * * * *